United States Patent [19]

Pham et al.

[11] Patent Number: 5,153,804
[45] Date of Patent: Oct. 6, 1992

[54] HYBRID CURRENT LIMITER HAVING SUPERCONDUCTOR WINDINGS

[75] Inventors: Van Doan Pham, Meyzieu; Jean-Pierre Dupraz, Lyons; Michel Collet, Villeurbanne; Yves Brunet, Gieres; Pascal Tixador, Grenoble, all of France

[73] Assignee: GEC Alsthom SA, Paris, France

[21] Appl. No.: 690,422

[22] Filed: Apr. 24, 1991

[30] Foreign Application Priority Data

Apr. 24, 1990 [FR] France ................ 90 05206
Jun. 14, 1990 [FR] France ................ 90 07427

[51] Int. Cl.$^5$ .............................. H02H 9/00
[52] U.S. Cl. ........................... 361/19; 361/58;
    361/141; 361/87; 505/850; 505/891; 324/248;
    335/216
[58] Field of Search .............. 361/19, 58, 141, 87,
    361/43, 111, 385, 46; 505/850, 881, 887, 885,
    891; 324/529, 248; 335/216; 357/82, 87

[56] References Cited

U.S. PATENT DOCUMENTS

| | | | |
|---|---|---|---|
| 3,629,690 | 12/1971 | Massar | 323/9 |
| 3,703,664 | 11/1972 | Cronin | 361/58 |
| 3,704,391 | 11/1972 | McConnell | 200/144 AP |
| 4,910,626 | 3/1990 | Collet et al. | 361/19 |
| 5,021,914 | 6/1991 | Tsurunaga et al. | 361/19 |
| 5,063,472 | 11/1991 | Van Doan et al. | 361/19 |

FOREIGN PATENT DOCUMENTS

| | | |
|---|---|---|
| 0336337 | 10/1989 | European Pat. Off. |
| 0350916 | 1/1990 | European Pat. Off. |
| 1588235 | 9/1970 | Fed. Rep. of Germany |
| 1932379 | 1/1971 | Fed. Rep. of Germany |
| 6415334 | 7/1965 | Netherlands |

OTHER PUBLICATIONS

Copy of Search Report, 2 pages, (Jan. 1991).

Primary Examiner—Steven L. Stephan
Assistant Examiner—E. H. To
Attorney, Agent, or Firm—Sughrue, Mion, Zinn, Macpeak & Seas

[57] ABSTRACT

A hybrid current limiter comprising a first winding of non-superconducting conductive material having a large number of turns and electrically connected in series with a superconductoring coil of low self-inductance and placed in a cryostat, and a second winding of non-superconducting conductive material having a small number of turns, said second winding being closely coupled with said first winding in such a manner as to obtain low overall inductance, the second winding being connected in parallel with the series circuit constituted by the first winding and the superconducting coil.

10 Claims, 3 Drawing Sheets

HYBRID CURRENT LIMITER HAVING SUPERCONDUCTOR WINDINGS

The present invention relates to a current limiter for limiting the value of a current, e.g. a fault current in an AC electrical installation or line.

BACKGROUND OF THE INVENTION

Proposals have been made in published French patent application number 2 629 956 for a limiter comprising two superconducting windings in parallel, each carrying equal current.

In U.S. Pat. No. 3,703,664, proposals are made to use a hybrid coil having a superconducting winding and a non-superconducting winding. The resistance of the non-superconducting winding is very low relative to its reactance. Current is shared equally between the two windings which have about the same number of turns. In the event of a fault, the switch-over or "transition" of the superconducting winding causes nearly all of the current to switch to the non-superconducting winding which behaves substantially like a pure inductance, thereby limiting the fault current.

The above-mentioned devices are not suitable for performing rapid reclosure cycles because of the relatively long period of time taken to return the superconducting winding to the superconducting state after a transition. The greater the current normally conveyed, the longer the time taken.

To solve this problem and to enable rapid reclosure cycles to be performed, proposals are made in French patent application number 90 03 398 to provide a limiter comprising a superconducting first winding and a non-superconducting second winding, the two windings being wound in opposite directions and being connected in parallel, with the number of turns in the superconducting winding being greater than the number of turns in the non-superconducting winding, and with the superconducting winding carrying a fraction of the total current, e.g. about 20%.

In such a limiter, a fault current greater than the critical current causes the superconducting winding to switch over so that its resistance increases suddenly. Nearly all of the current then passes through the non-superconducting winding, however the self-inductance of this winding limits the value of the current. Since the current normally conveyed is relatively low, and in spite of a higher restored voltage, the superconducting winding returns to the superconducting state fast enough to make rapid reclosure cycles possible.

In the limiter described above, the superconducting winding is housed in an insulating cryostat and it is wound inside the non-superconducting second winding. The insulating cryostat, e.g. filled with liquid helium, requires a certain thickness of insulation which does not facilitate the establishment of close electromagnetic coupling between the two windings. The inductive voltage loss across the terminals of the limiter in normal operation runs the risk of exceeding the acceptable threshold, i.e. about 5% of the phase-ground voltage.

An object of the present invention is to provide a device which avoids the above-mentioned drawback while conserving the property of making rapid reclosure cycles possible.

SUMMARY OF THE INVENTION

The present invention provides a hybrid current limiter comprising a first winding of non-superconducting conductive material having a large number of turns and electrically connected in series with a superconducting coil of low self-inductance and placed in a cryostat, and a second winding of non-superconducting conductive material having a small number of turns, said second winding being closely coupled with said first winding in such a manner as to obtain low overall inductance, said second winding being connected in parallel with the series circuit constituted by said first winding and said superconducting coil.

Advantageously, the superconducting coil comprises two similar superconducting windings wound in opposite directions.

In a particular embodiment, the first and second windings form parts of an assembly comprising a tube of insulating material having a sleeve engaged thereover, the axial half-section of the sleeve being in the form of a comb having teeth that delimit wide and shallow grooves which receive the turns of the second winding together with narrower and deeper grooves which receive the turns of the first winding, the turns of the first winding being wound in the opposite direction to the turns of the second winding.

A varistor may be connected across the terminals of the first winding.

Advantageously, a core made of a material having good magnetic permeability is placed inside the tube.

In a particular embodiment, the magnetic core constitutes a closed and saturable circuit with the first and second windings being wound separately.

Superconductors are used in current limiters because of their transition property whereby they switch over to the normal resistive state as soon as the current they carry exceeds a certain limit value. When such a transition takes place, the resistance of the superconductor element increases by several orders of magnitude, and this happens practically instantaneously. If a short circuit occurs on the line, the response of the limiter is thus very fast. However, after a transition, the higher the current normally conveyed, the longer the time that must be allowed for the superconductor to return to its superconducting state. This is very inconvenient if it is desired that the limiter should be capable of operating in open-0.3 seconds-close-open cycles. It is therefore of great importance to find ways of reducing the permanent current carried by the superconducting elements.

The above-described current limiter serves to reduce the current carried by the superconducting elements by using a circuit having two branches in parallel, with the circuit being designed in such a manner that only a small portion of the main nominal current is conveyed by the superconducting elements. The use of a two-branch saturable magnetic circuit is advantageous in making it possible to reduce the voltage that exists across the terminals of the superconducting coil.

As an improvement to this magnetic circuit, it has been discovered that it is possible to change its coupling coefficient quickly, thereby very greatly reducing the voltage across the terminals of the superconducting winding. There is then a corresponding reduction in the heat energy dissipated by the superconducting portion. This makes it possible to use a circuit breaker having a three-cycle interrupt time instead of a one-cycle interrupt time.

To this end, in a variant embodiment, provision is made to use a magnetic circuit having three branches, with the first and second windings being wound on respective separate branches and with a third branch being interrupted by a gap while nevertheless being capable of looping the flux present in the first two branches by virtue of having a moving part. In association with a varistor connected in parallel with the first winding, this three-branch magnetic circuit makes it possible to change the coupling coefficient quickly and thus obtain the looked-for result.

To this end, a magnetic circuit comprising first and second branches whose first and second ends are commoned together to form a closed circuit has the first and second windings wound on respective branches thereof, the circuit further including a middle branch situated between said first ends and said second ends, said middle branch including a gap and a moving magnetic part suitable for closing the gap, together with a return device acting on the moving magnetic part to oppose closure of the gap.

In a particular embodiment, the magnetic part constitutes a plunging core suitable for sliding in a housing formed in the middle branch.

The return device may include a spring.

Advantageously, the middle branch and the branch on which the second winding is wound are larger in section than the branch on which the first winding is wound.

A varistor may be connected across the terminals of the first winding.

BRIEF DESCRIPTION OF THE DRAWINGS

Embodiments of the invention are described by way of example with reference to the accompanying drawing, in which.

MORE DETAILED DESCRIPTION

Figure 1:
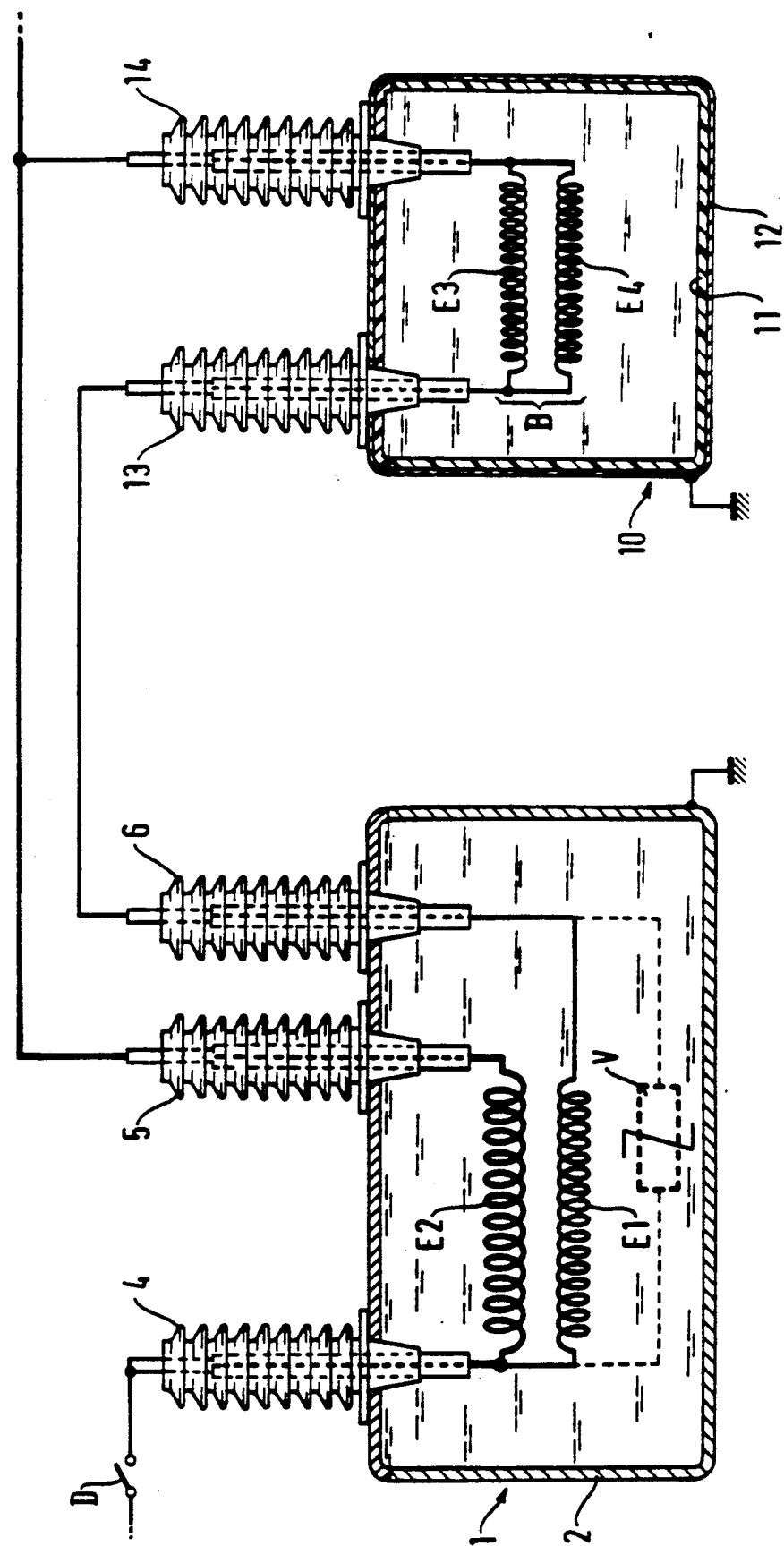
FIG. 1 is a diagrammatic view of a limiter of the invention.

In FIG. 1, reference 1 designates an enclosure comprising a metal tank 2 which is grounded. The enclosure has three insulating feedthroughs 4, 5, and 6 and it is filled with a cooling and insulating liquid or gas such as air, oil, sulfur hexafluoride, etc. . . . .

Inside the enclosure 1, there are disposed a copper first winding E1 of small section and having a large number of turns, and a copper second winding E2 of large section and having a number of turns that is at least four times smaller than the number of the first winding E1. The windings E1 and E2 are wound in opposite directions and very tight coupling is provided between these two windings so that the overall inductance of the assembly is very low. One particular way of achieving such coupling is described below.

Adjacent to the enclosure 1, there is a cryostat 10 constituted by an insulating tank 11 which is grounded by metal cladding 12 and which has two insulating feedthroughs 13 and 14. A superconducting coil given an overall reference B is disposed inside the cryostat, which winding is, in fact, constituted by two superconducting windings E3 and E4 which are connected electrically in parallel and which are wound in opposite directions so as to confer very low inductance to the winding. The inside of the cryostat is filled with a cryogenic fluid at a temperature which is low enough to keep the coil B in the superconducting state. If the coil is made of niobiumtitanium, then the cryogenic fluid is liquid helium.

The connection between the enclosure 1 and the cryostat 10 is provided to connect the winding E1 in series with the coil B, and to connect the winding E2 in parallel with the series circuit constituted by the winding E1 and the coil B.

A conventional circuit breaker D is connected in series with the limiter of the invention.

Operation is as follows:

under normal conditions, the circuit breaker D is closed and carries the nominal current In; a small fraction of this current passes through the branch constituted by the winding E1 and the superconducting coil B;

if a short circuit occurs, then the value of the current conveyed by the coil B exceeds its critical value, the coil B therefore switches to the non-superconducting state and consequently its resistance becomes very high. Substantially all the current then flows through the other branch constituted by the winding E2. The fault current is then limited by the self-inductance of the winding E2. This inductance must be sufficient to keep the fault current down to a value that is not more than about three or four times In. This residual current is interrupted without difficulty by the circuit breaker D.

Figure 2:
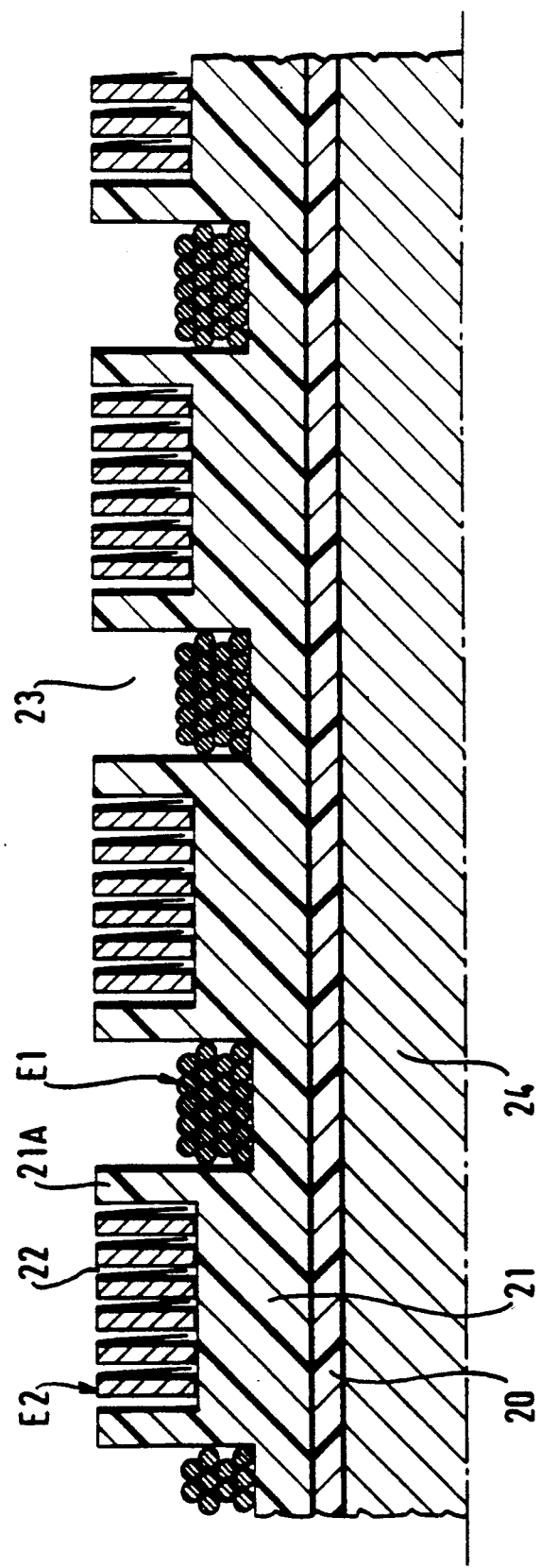
FIG. 2 is a fragmentary axial section view through a set of two non-superconducting windings.

FIG. 2 is a fragmentary axial section through one embodiment of the windings E1 and E2 showing how very tight coupling is obtained between these windings.

The assembly comprises a tube 20 made of insulating material having a sleeve 21 fitted thereover, with the axial half-section of the sleeve being in the form of a comb having teeth 21A delimiting wide and shallow grooves 22 that receive the turns of the winding E2 and narrower and deeper grooves 23 that receive the turns of the winding E1. This disposition provides close coupling between the windings E1 and E2 so that the overall inductance is very low. The coupling may be further increased by placing a core 24 inside the tube 20, said core having good magnetic permeability.

Using a core 24 that is closed and saturable, it is possible to reduce the dimensions of the windings E1 and E2 significantly, with each of them then being wound separately on a respective branch of a magnetic circuit. This makes it possible to achieve a high coupling coefficient under normal conditions and a lower coupling coefficient under fault conditions.

The limiter of the invention is effective and cheap.

Because of the tight coupling between the windings E1 and E2 the inductance of the non-superconducting assembly is very low and the voltage drop across the terminals of the limiter remains much lower than the maximum acceptable value.

The cryostat containing the coil B is conventional so there is no need to provide a specially designed thermally and dielectrically insulating cryostat as required in the above-mentioned prior art circuit which is thus more expensive.

The disposition of the selected electrical circuit also makes it possible to ensure that the current carried by the superconducting coil is very low, such that losses on transition are also low, thereby making it possible to return quickly to the superconducting state and thus making it possible to perform rapid reclosure cycles using the conventional circuit breaker D.

With an inductive drop in normal operation equal to 5% of the phase-ground voltage, and with a short circuit current limited to three times the nominal current, a coupling coefficient of 0.85 makes it possible to obtain a current flowing through the winding E1 which is about seven times smaller than the current flowing through the winding E2.

Surge across the terminals of the limiter can be reduced by using a metal oxide varistor, e.g. a zinc oxide varistor. In particular, it is advantageous to connect a varistor V (shown in dashed lines in FIG. 1) across the terminals of the winding E1 so as to limit the voltage across the terminals of the winding E1 by inserting resistance while it operates. This serves also to reduce the voltage applied to the superconducting coil B while limiting the short circuit current on the network without changing the coupling coefficient.

Figure 3:
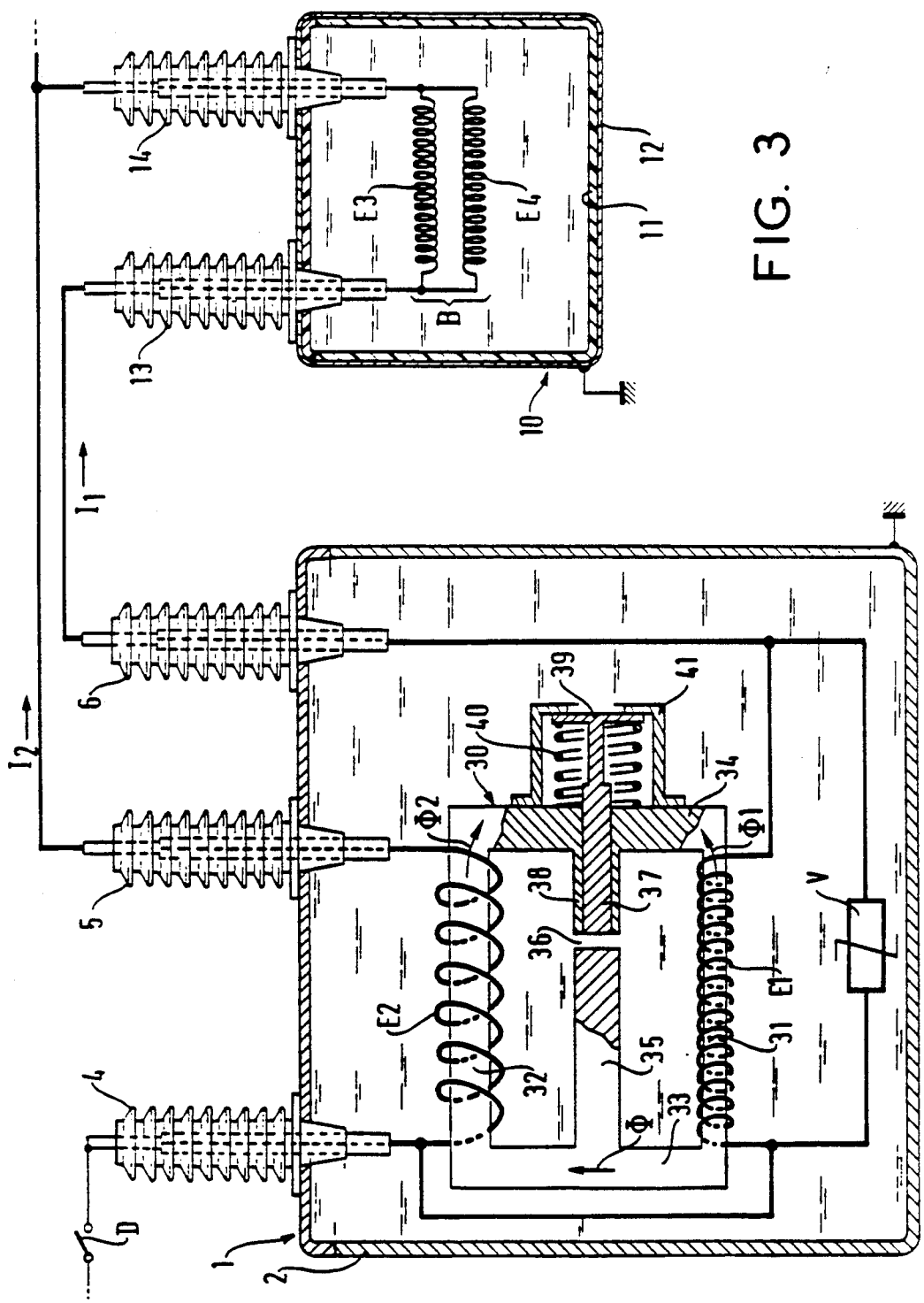
FIG. 3 is a view of a variant limiter of the invention.

FIG. 3 shows a variant embodiment.

In this embodiment, the windings E1 and E2 are wound on two separate branches 31 and 32 of a magnetic circuit 30. The magnetic circuit 30 is closed by side branches 33 and 34. It also includes a middle branch 35 interconnecting the side branches 33 and 34 and including a gap 36. The middle branch includes a moving magnetic piece constituted in the present case by a plunging core 37 suitable for sliding in a machined housing 38 in the middle branch 35, and starting from side branch 34. Outside the magnetic circuit 30, the plunging core 37 is terminated by a retention abutment 39 which co-operates with a spring 40 and a pot 41 fixed ont he side branch 34 to constitute a return device for the plunging core that exerts a force thereon tending to pull it away from the gap 36.

In normal operation with the nominal current In, the fluxes $\phi 1$ and $\phi 2$ induced in the branches 31 and 32 respectively are practically equal and they cancel. The resultant flux $\phi$ is therefore very low. There is then no flux or substantially no flux in the middle branch 35 and thus no magnetic field in this branch. The plunging magnetic core 37 remains inside its housing 38. It is held in this position by the return spring 40. The current I1 flowing through the superconducting coil B is equal to a small fraction of the nominal current In.

In the event of a fault on the utilization line, the currents I1 and I2 (where I2 is the current flowing through the winding E2) increase. When the current I1 reaches the critical value, the superconducting windings E3 and E4 switch over. They then become highly resistive. The limiter then comes into operation.

The current I1 falls off very considerably and very quickly. The same applies to the flux $\phi 1$. The current I2 is limited to a value of $3 \times In$ by the self-inductance of the winding E2 which is designed for this purpose.

The flux $\phi 2$ corresponding to a current $I2 = 3 \times In$ is much greater than $\phi 1$. The flux $\phi 2$ then passes via the branch 31 supporting the winding E1 and may give rise to a large voltage simultaneously across the terminals of the varistor V and across the terminals of the windings E3 and E3. The varistor V is designed to operate at a relatively low voltage, thereby allowing a higher current to flow. The flux $\phi 1$ increases rapidly and opposes $\phi 2$. These two fluxes then tend to pass along and middle branch 35, thereby establishing a magnetic field. The plunging core 37 is attracted towards the facing portion of the middle branch and closes the gap 36. The major portion of the flux $\phi 2$ is then looped through the middle branch 35. The voltage across the terminals of the widning E1 drops and its value comes closer to the voltage applied to the winding E2, i.e. to the fault phase to ground voltage. The same applies to the voltage across the terminals of the coil B.

In order to facilitate passage of the flux $\phi 2$ through the middle branch 35, it is advantageous to provide a magnetic circuit such that the section of the branch 31 carrying the winding E1 is smaller than the sections of the branches 32 and 35.

With such a limiter, the circuit breaker D can open about 60 milliseconds after the appearance of a fault on the line, thereby interrupting the residual fault current (equal to about $3 \times In$). The spring 40 then returns the plunging core 37 to its initial rest position.

The invention is applicable to making limiters for high or medium tension electrical installations or networks.

We claim:

1. A hybrid current limiter comprising: a cryostat, a superconducting coil of low self-inductance placed in said cryostat, a first winding of non-superconducting conductive material positioned external of said cryostat and having a large number of turns, said first winding being connected in series with said superconducting coil, a second winding of non-superconducting conductive material positioned external of said cryostat and having a small number of turns, said second winding being closely coupled with said first winding to obtain lower overall inductance, and said second winding being connected in parallel with a series circuit constituted by said first winding and said superconducting coil, whereby the coupling coefficient of the magnetic circuit is quickly changed, greatly reducing the voltage across the terminals of the superconducting winding with a corresponding reduction in heat energy dissipated by the superconducting portion.

2. A limiter according to claim 1, wherein the superconducting coil comprises two similar superconducting windings wound in opposite directions.

3. A limiter according to claim 1, wherein the first and second windings form parts of an assembly comprising a tube of insulating material having a sleeve engaged thereover, said sleeve including an axial half-section constituting a comb having teeth delimiting wide and shallow grooves receiving turns of the second winding, said teeth further delimiting narrower and deeper grooves receiving turns of the first winding, and wherein the turns of the first winding are wound in the opposite direction to the turns of the second winding.

4. A limiter according to claim 3, wherein a core made of a material having good magnetic permeability is placed inside the tube.

5. A limiter according to claim 4, wherein the magnetic core constitutes a closed and saturable circuit with the first and second windings wound separately.

6. A hybrid current limiter according to claim 1, wherein a magnetic circuit comprises first and second branches having first and second ends commoned together to form a closed circuit, and said first and second windings are wound on respective branches thereof, and said circuit further including a middle branch situated between said first ends and said second ends, said middle branch including a gap and a moving magnetic part for closing the gap, and a return device acting on the moving magnetic part to oppose closure of the gap.

7. A hybrid current limiter according to claim 6, wherein the magnetic part constitutes a plunging core sliding in a housing formed in the middle branch.

8. A hybrid current limiter according to claim 6, wherein said the return device comprises a spring.

9. A hybrid current limiter according to claim 6, wherein both the middle branch and the branch on which the second winding is wound are larger in section than the branch on which the first winding is wound.

10. A limiter according to claim 1, wherein a varistor is connected across the terminals of the first winding.

* * * * *